United States Patent
Cho et al.

(10) Patent No.: US 10,040,400 B2
(45) Date of Patent: Aug. 7, 2018

(54) RETAINING DEVICE

(71) Applicant: PIOLAX, INC., Yokohama-shi (JP)

(72) Inventors: Jung Hyung Cho, Incheon (KR); Bong Won Jung, Incheon (KR)

(73) Assignee: PIOLAX, INC., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/114,059

(22) PCT Filed: Feb. 6, 2014

(86) PCT No.: PCT/JP2014/000642
§ 371 (c)(1),
(2) Date: Jul. 25, 2016

(87) PCT Pub. No.: WO2015/118572
PCT Pub. Date: Aug. 13, 2015

(65) Prior Publication Data
US 2017/0001571 A1     Jan. 5, 2017

(51) Int. Cl.
*B60R 5/00* (2006.01)
*B60R 7/08* (2006.01)

(52) U.S. Cl.
CPC . *B60R 7/08* (2013.01); *B60R 5/00* (2013.01)

(58) Field of Classification Search
CPC ..... B60R 7/10; B60R 7/08; B60P 7/06; B60P 7/08; B60P 7/0807; Y10S 224/927
USPC ........................................ 224/539, 544, 927
See application file for complete search history.

(56) References Cited

FOREIGN PATENT DOCUMENTS

| JP | 2002-331865 A | 11/2002 |
| JP | 2002331865 A | * 11/2002 |
| JP | 2004-019763 A | 1/2004 |
| JP | 2004019763 A | * 1/2004 |
| JP | 2006-007983 A | 1/2006 |
| JP | 2006-103524 A | 4/2006 |
| JP | 2007-313916 A | 12/2007 |
| JP | 5393855 B1 | 1/2014 |
| KR | 10-0921297 B1 | 10/2009 |

OTHER PUBLICATIONS

Japanese Office Action dated May 9, 2017 in Japanese Application No. 2015-560849 with an English translation thereof.
International Search Report (ISR) (PCT Form PCT/ISA/210), in PCT/JP2014/000642, dated Apr. 28, 2014 (with English version).

* cited by examiner

*Primary Examiner* — Adam Waggenspack
(74) *Attorney, Agent, or Firm* — McGinn I.P. Law Group, PLLC.

(57) ABSTRACT

The present invention is a retaining device, wherein a pedestal part is attached to a vehicle. The retaining part has a turning shaft part and a loading part. A main body turnably supports the turning shaft part. An outward-jutting part is provided on the main body and is designed to be secured to the bottom part of the pedestal part. A locking part is provided on the main body. A part to be locked is locked to the locking part. The locking part and the outward-jutting part are provided so as to sandwich the turning shaft part, and receive the load applied to the loading part.

12 Claims, 11 Drawing Sheets

RETAINING DEVICE

TECHNICAL FIELD

The present invention relates to a retaining device that includes a bearing portion to receive a load applied on a baggage hanging portion.

BACKGROUND ART

The hooking device for vehicle disclosed in Patent Literature 1 includes a housing mounted on a vehicle body panel, a ring-shaped hooking portion including a rotational shaft, and a bearing block including a bearing groove to rotatably support the rotational shaft of the hooking portion. The hooking portion is rotatably supported by the bearing block to take a housing position and a used position.

The bearing block and the housing in Patent Literature 1 are integrated by being bolted. The bearing block in Patent Literature 1 includes a through-hole in its plate-shaped fixing portion as a hole for a bolt while the housing includes a mounting hole in its bottom plate. While the bearing groove of the bearing block and the bottom plate of the housing sandwich the rotational shaft of the hooking portion therebetween, the bolt is inserted into the through-hole of the bearing block and the mounting hole of the housing to be fastened and fixed to the vehicle body panel.

CITATION LIST

Patent Literature

Patent Literature 1

JP-2002-331865-A

SUMMARY OF THE INVENTION

Problem that the Invention is to Solve

In the technique described in Patent Literature 1, the bearing block to support the hooking portion is fixed by being bolted at the fixing portion, so that the load applied from the hooking portion concentrates on the fixing portion of the bearing block. For this reason, when the load increases, the structure to support the hooking portion only with the fixing portion could result in having insufficient load bearing performance.

The present invention is made in view of the above problem, and an object of the present invention is to provide a retaining device having improved load bearing performance.

Means for Solving the Problem

In order to solve the problem described above, one embodiment of the present invention provides a retaining device including: a pedestal portion mounted on a vehicle; a retaining portion including a rotating shaft portion and a baggage hanging portion; and a bearing portion. The bearing portion includes: a main body portion that rotatably supports the rotating shaft portion; a flared portion that is disposed on the main body portion, and is fixed to a bottom portion of the pedestal portion; and a locking portion disposed on the main body portion. The pedestal portion includes a locked portion to be engaged with the locking portion. The locking portion and the flared portion are disposed to sandwich the rotating shaft portion therebetween, and receive a load applied on the baggage hanging portion.

Advantageous Effects of Invention

With the present invention, the load bearing performance of the retaining device can be improved.

BRIEF DESCRIPTION OF THE DRAWINGS

FIGS. 10A and 10B are views for illustrating a shaft structure of a retaining device according to the second modification.

MODE FOR CARRYING OUT THE INVENTION

Figure 1A:
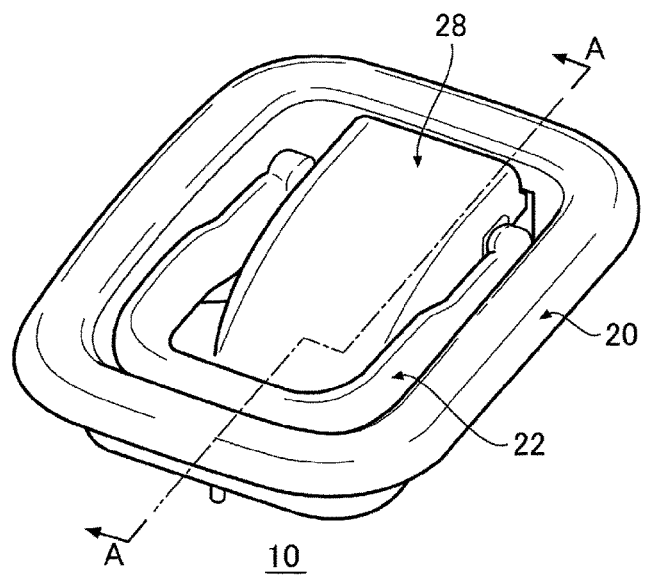
FIG. 1A is a perspective view of a retaining device according to one embodiment of the present invention.
Figure 1B:
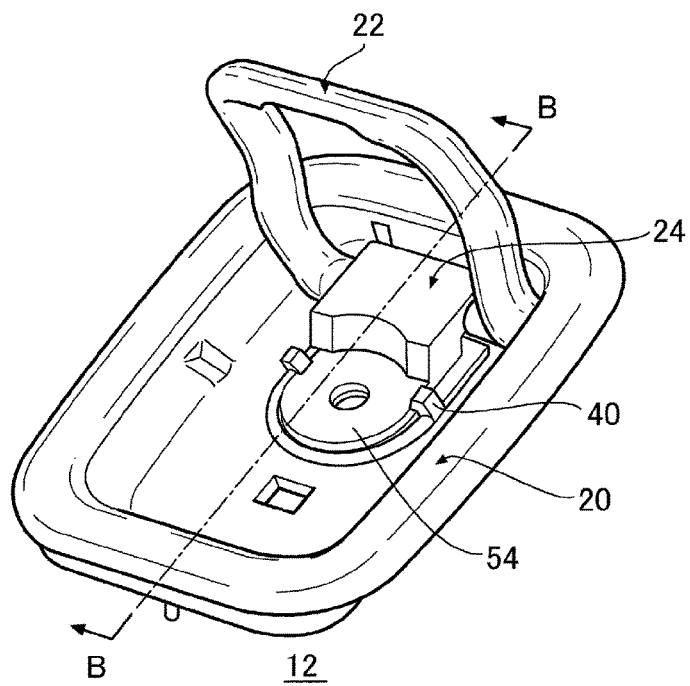
FIG. 1B is a perspective view of a sub-assembly unit where the retaining device according to the present embodiment is in the middle of assembly.
Figure 2:
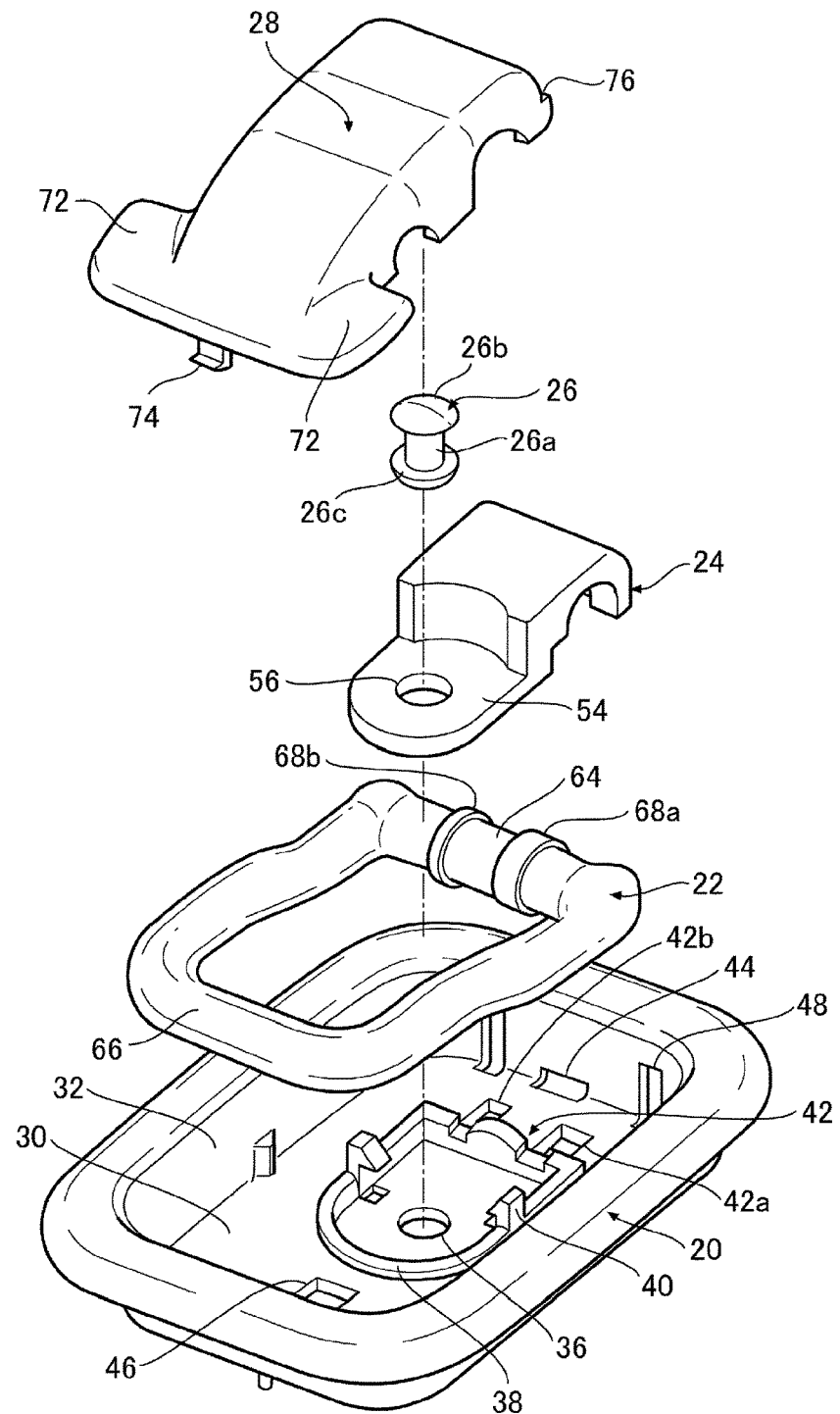
FIG. 2 is an assembly drawing of the retaining device according to the embodiment.

FIG. 1A is a perspective view of a retaining device 10 according to one embodiment of the present invention, and FIG. 1B is a perspective view of a sub-assembly unit 12 where the retaining device 10 according to the present embodiment is in the middle of assembly. FIG. 2 is an assembly drawing of the retaining device 10 according to the present embodiment. In the present description, same or equivalent constituent elements shown in the drawings are provided with same reference numerals, and repeated descriptions of the same or equivalent constituent elements are omitted as appropriate.

The retaining device 10 is mounted on a predetermined mounted member in a vehicle cabin. The mounted member defines an interior member such as a vehicle trim member, a dashboard, and a seat, and a vehicle body panel. The retaining device 10 is mounted on the dashboard, a back surface of a seat such as a driver seat and a passenger seat, a side surface of a door, and the like so as to be embedded therein. The retaining device 10 is used to hook a baggage, a rope, or a net, and functions as a retaining device to retain a baggage.

As shown in FIG. 2, the retaining device 10 includes a pedestal portion 20, a retaining portion 22, a bearing portion 24, a rivet 26, and a cover portion 28. The pedestal portion 20 houses other components, and is fixed to the mounted member of a vehicle. The retaining portion 22 is arranged to hook a baggage. The bearing portion 24 rotatably supports the retaining portion 22. The rivet 26 is used to fix the pedestal portion 20 and the bearing portion 24 to a mounting hole of the mounted member of the vehicle. The cover portion 28 covers the bearing portion 24 and the rivet 26.

As shown in FIG. 1B, in the sub-assembly unit 12 of the retaining device 10, the retaining portion 22 and the bearing portion 24 are mounted on the pedestal portion 20. The sub-assembly unit 12 is fixed to the mounted member by the rivet 26, on which the cover portion 28 is mounted. Thereby, the retaining device 10 is constituted. The sub-assembly unit 12 is of a monolithic construction assembled from three members of the pedestal portion 20, the retaining portion 22, and the bearing portion 24, and is thus made transportable.

FIG. 1A shows a housed state where the retaining portion 22 is housed in the pedestal portion 20, and FIG. 1B shows a pullout state where the retaining portion 22 is pulled out of the pedestal portion 20, and a baggage can be directly hooked on a baggage hanging portion 66 of the retaining portion 22. The retaining portion 22 rotationally moves to be brought into the housed state and the pullout state. The housed state defines a state where the retaining portion 22 is housed in the pedestal portion 20 to be made approximately parallel to the bottom surface of the pedestal portion 20. The pullout state defines a state where the retaining portion 22 rotates, for example, approximately 90 degrees with respect to the housed position to be made usable.

As show in FIG. 2, the rivet 26 includes a pillar portion 26a, a first flange portion 26b, and a second flange portion 26c. The first flange portion 26b and the second flange portion 26c extend in the radial outer direction from the both the ends of the pillar portion 26a. The second flange portion 26c is pushed into an insertion hole 56 of the bearing portion 24 and an insertion hole 36 of the pedestal portion 20, and passes through also a mounting hole of the mounted member of the vehicle to be engaged with the edge of the mounting hole. The first flange portion 26b is engaged with the insertion hole 56 of the bearing portion 24. Using the rivet 26 allows easier assembling than screwing using a screw member. The sub-assembly unit 12 may be assembled using a screw member such as a bolt.

As shown in FIG. 2, the cover portion 28 includes a wide portion 72, a pawl portion 74, and an engagement portion 76. The cover portion 28 covers the bearing portion 24 and the rivet 26. The pawl portion 74 and the engagement portion 76 are arranged to fix the cover portion 28 to the pedestal portion 20. The wide portion 72 has a width larger than the length of the shaft of the rotating shaft portion 64 of the retaining portion 22, and slightly smaller than the width of the bottom portion 30 of the pedestal portion 20. With this configuration, when the retaining portion 22 is pulled out, the cover portion 28 can hide a large region of the bottom portion 30. The wide portion 72 gets in under the distal end side of the retaining portion 22. Thereby, the distal end side of the retaining portion 22 can be disposed close to the opening of the pedestal portion 20 even in the housed state. Thus, the retaining portion 22 can be pulled out more easily than a state where the retaining portion 22 is in contact with the bottom portion 30 of the pedestal portion 20. A detailed description of the other components will be provided with reference to other drawings.

Figure 3A:
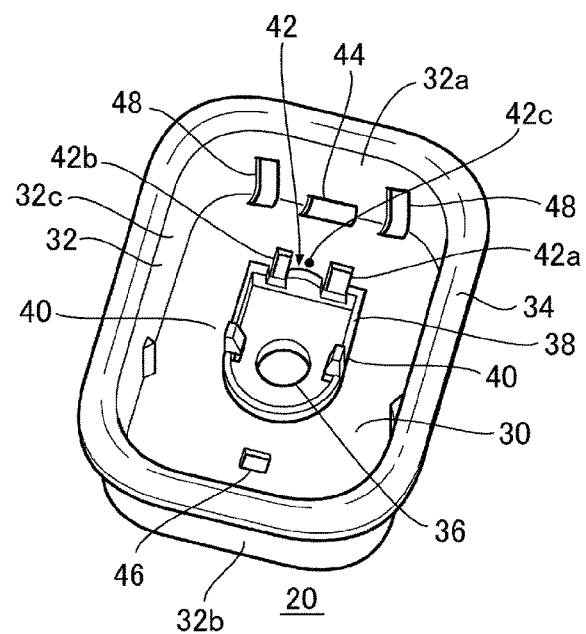
FIG. 3A is a perspective view of a pedestal portion when watched from the top side.
Figure 3B:
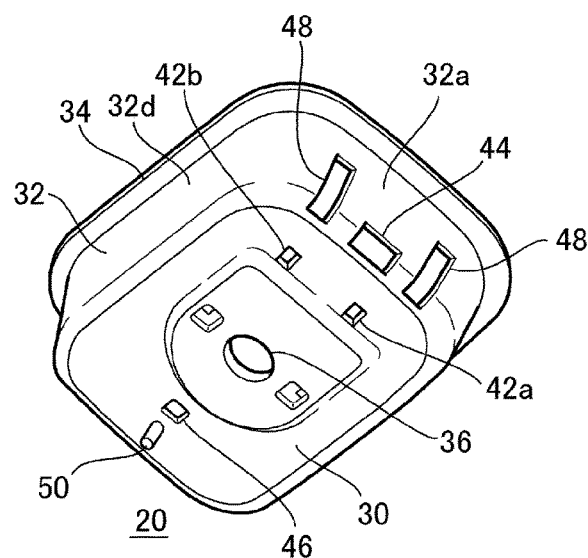
FIG. 3B is a perspective view of the pedestal portion when watched from the back side.

FIG. 3A is a perspective view of the pedestal portion 20 when watched from the top side. FIG. 3B is a perspective view of the pedestal portion 20 when watched from the back side. The pedestal portion 20 has a box shape, and houses other components. The pedestal portion 20 includes the bottom portion 30, a side wall portion 32, a flange portion 34, the insertion hole 36, a frame portion 38, elastic pawl portions 40, a first supporting portion 42a, a second supporting portion 42b, a locked portion 44, a first hook hole 46, second hook holes 48, and a positioning portion 50.

The pedestal portion 20 is shaped into a box constituted from the rectangular plate-like bottom portion 30 and the side wall portion 32 erected from the edge of the bottom portion 30. The flange portion 34 extends outward from the side wall portion 32. The bottom portion 30 and the side wall portion 32 get in the opening of the mounted member, and the flange portion 34 is hooked on the edge of the opening in the mounted state on the vehicle. The first side wall portion 32a and the second side wall portion 32b are opposed to each other, and the opposing direction is orthogonal to the axial direction of the rotating shaft portion 64 of the retaining portion 22. In addition, the third side wall portion 32c and the fourth side wall portion 32d are opposed to each other, and connect the first side wall portion 32a and the second side wall portion 32b.

The insertion hole 36, the frame portion 38, the elastic pawl portions 40, the first supporting portion 42a, the second supporting portion 42b, the first hook hole 46, and the positioning portion 50 are disposed on the bottom portion 30. The supporting portions 42 include the first supporting portion 42a and the second supporting portion 42b. The first supporting portion 42a and the second supporting portion 42b are disposed on the bottom portion 30, and rotatably support the rotating shaft portion 64 of the retaining portion 22.

The insertion hole 36 is disposed close to the center of the bottom portion 30, and the rivet 26 is insertable into the insertion hole 36. The frame portion 38 is disposed around the insertion hole 36, and positions the bearing portion 24. The bearing portion 24 may be press-fitted to the frame portion 38.

The pair of elastic pawl portions 40 are arranged to fasten down the bearing portion 24, and warped to open to be capable of receiving the bearing portion 24. The pair of elastic pawl portions 40 are opposed to each other to be erected from the frame portion 38 of the bottom portion 30.

The supporting portions 42 rotatably support the rotating shaft portion of the retaining portion 22. The first supporting portion 42a is smaller in width than the second supporting portion 42b. With this configuration, the supporting portions 42 are asymmetric with respect to a center position 42c in the axial direction of the rotating shaft portion. The first hook hole 46 is disposed on the bottom portion 30, and is arranged to hook one end of the cover portion 28. The pair of second hook holes 48 are disposed on the side wall portion 32, and are arranged to hook the other end of the cover portion 28. The second supporting portion 42b may be smaller in width than the first supporting portion 42a.

The locked portion 44 defines a concave portion that is recessed into the side wall portion 32. The concave portion defined as the locked portion 44 shown in FIG. 3A has a penetration shape; however, the concave portion may have a bottomed shape. As long as a convex portion can be engaged with the concave portion defined as the locked portion 44, the concave portion may have a penetration shape or may have a bottomed shape. The locked portion 44 is disposed between the pair of second hook holes 48. The locked portion 44 is disposed on the first side wall portion 32a at the center position of the rotating shaft portion in the axial direction. The locked portion 44 that defines a concave portion may be disposed on the bottom portion 30 of the pedestal portion 20.

The positioning portion 50 protrudes from the back surface of the bottom portion 30, and makes positioning in being mounted on the mounted member. After the positioning portion 50 is inserted into a positioning hole provided to the mounted member and positioning is made, the pedestal portion 20 is fixed by the rivet 26. Thereby, the mounting operation can be facilitated.

Figure 4:
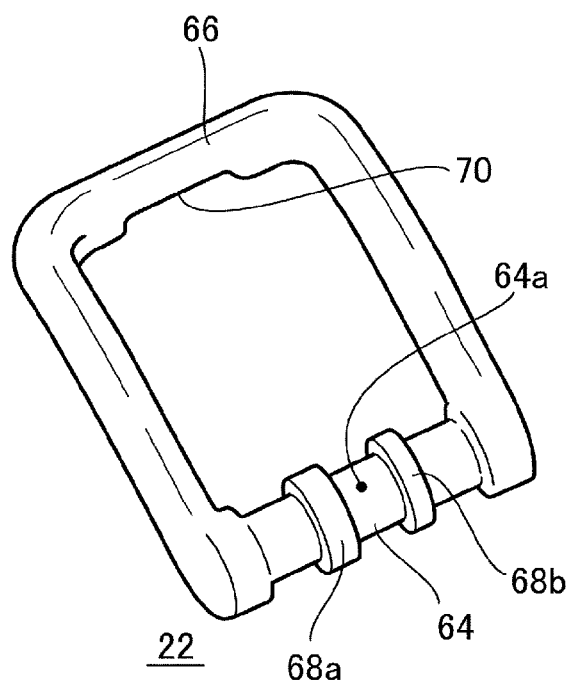
FIG. 4 is a perspective view of a retaining portion.

FIG. 4 is a perspective view of the retaining portion 22. The retaining portion 22 includes the rotating shaft portion 64, the baggage hanging portion 66, a first ring portion 68a, a second ring portion 68b, and a dent portion 70. The baggage hanging portion 66 is connected to both the ends of the rotating shaft portion 64, and has an approximately U-shape having right-angled corners. The dent portion 70 is disposed on the distal end side of the baggage hanging portion 66 at the position opposed to the rotating shaft portion 64. The dent portion 70 is provided such that a user can easily hook his/her finger on the baggage hanging portion 66.

The first ring portion 68a and the second ring portion 68b (referred to as the ring portions 68 when they are not distinguished from each other) protrude in the radial direction from the rotating shaft portion 64, and have an annular shape so as to circumferentially surround the rotating shaft portion 64. The first ring portion 68a and the second ring portion 68b are different in width in the axial direction, and the rotating shaft portion 64 is asymmetric with respect to a center position 64a in the axial direction. The first ring portion 68a is larger in width in the axial direction than the second ring portion 68b.

Figure 5A:
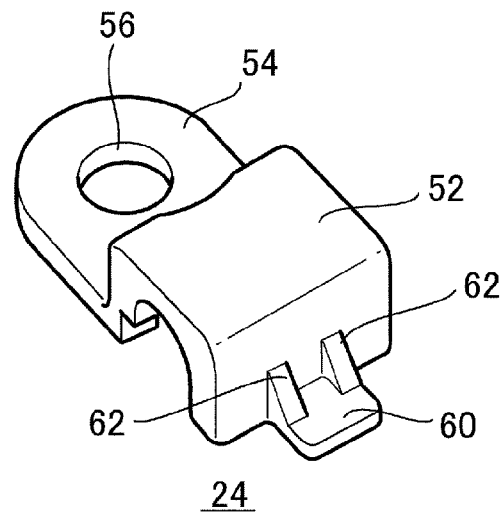
FIG. 5A is a perspective view of a bearing portion when watched from the top side.
Figure 5B:
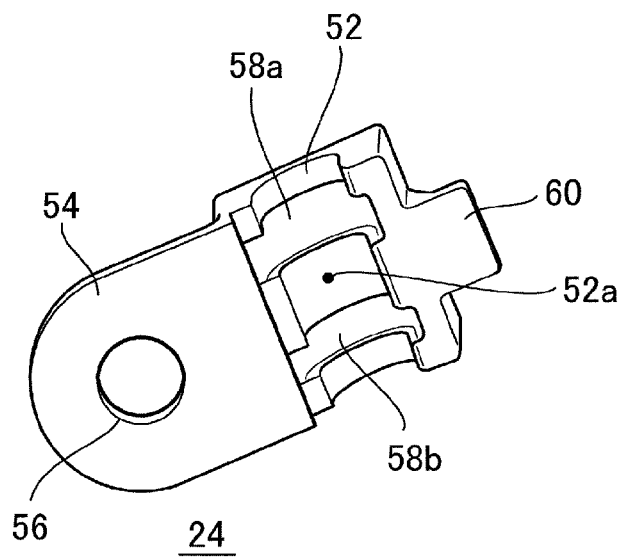
FIG. 5B is a perspective view of the bearing portion when watched from the back side.

FIG. 5A is a perspective view of the bearing portion 24 when watched from the top side. FIG. 5B is a perspective view of the bearing portion 24 when watched from the back side. The bearing portion 24 is made from a synthetic resin material having high rigidity than the pedestal portion 20. By making the separate bearing portion 24 from a harder material than the pedestal portion 20, the retaining device 10 can be more improved in load bearing performance than a retaining device in which a bearing is formed in a pedestal portion 20. The bearing portion 24 includes a main body portion 52, a flared portion 54, the insertion hole 56, a first shaft supporting portion 58a, a second shaft supporting portion 58b, a locking portion 60, and a rib 62.

While rotatably supporting the rotating shaft portion 64 of the retaining portion 22, the bearing portion 24 connects the rotating shaft portion 64 to the pedestal portion 20. As shown in FIG. 5B, the first shaft supporting portion 58a and the second shaft supporting portion 58b taking the form of the rotating shaft portion 64 are disposed on the cylindrical inner circumferential surface of the main body portion 52 of the bearing portion 24. The first shaft supporting portion 58a is larger in width in the axial direction than the second shaft supporting portion 58b. The main body portion 52 is asymmetric with respect to a center position 52a in the axial direction of the rotating shaft portion 64. The second shaft supporting portion 58b is larger in width in the axial direction than the first shaft supporting portion 58a.

The flared portion 54 extends in the radial outer direction of the rotating shaft portion 64 from one end of the main body portion 52. The flared portion 54 includes the insertion hole 56 to be fixed to the bottom portion 30 of the pedestal portion 20. The rivet 26 is inserted into the insertion hole 56.

The locking portion 60 protrudes in the radial outer direction of the main body portion 52 from the other end of the main body portion 52. The locking portion 60 and the flared portion 54 are disposed so as to sandwich the rotating shaft portion 64 therebetween, and protrude in different directions in the radial outer direction. The locking portion 60 and the flared portion 54 may protrude in parallel in the opposite directions while sandwiching the rotating shaft portion 64 therebetween.

The rib 62 connects the front surface of the locking portion 60 and the side surface of the main body portion 52 to improve the rigidity of the locking portion 60. The rib 62 controls the locking portion 60 not to excessively get in the locked portion 44 of the pedestal portion 20 in the sub-assembly unit 12.

Figure 6A:
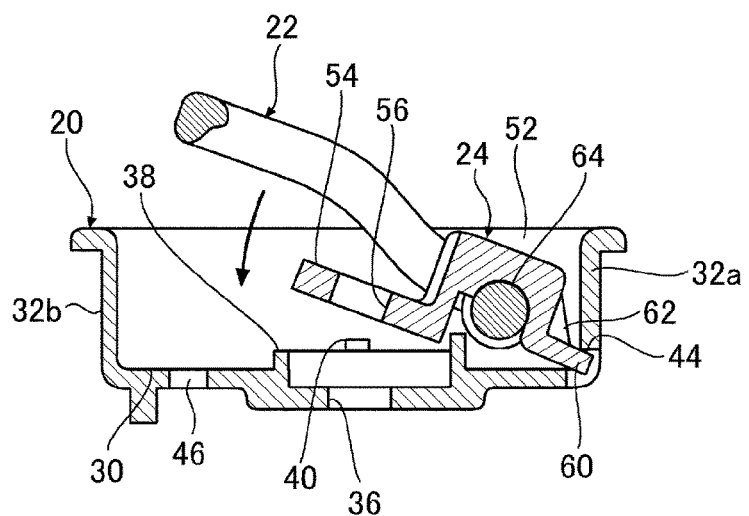
FIGS. 6A and 6B are views for illustrating the assembly of the bearing portion.
Figure 6B:
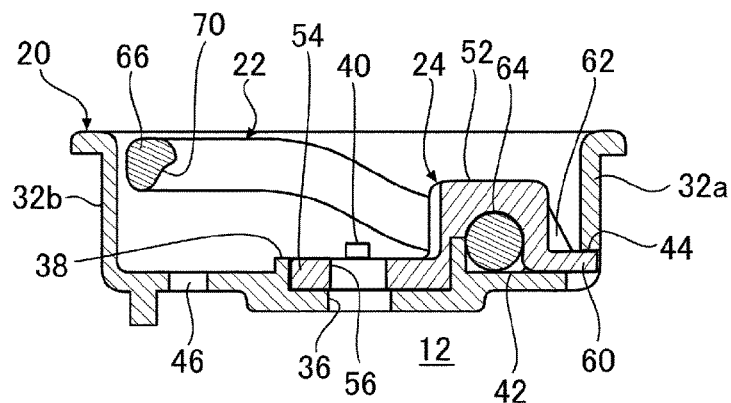

FIGS. 6A and 6B are views for illustrating the assembly of the bearing portion 24. FIG. 6A is a view of the bearing portion 24 in the middle of assembly, and FIG. 6B is a view of the bearing portion 24 that has been already assembled. It is to be noted that FIG. 6B is a cross-sectional view of the sub-assembly unit 12 taken along the line B-B of FIG. 1B, and that FIG. 6A is also a cross-sectional view of the same.

The locking portion 60 is inserted into the locked portion 44 while the rotating shaft portion 64 is positioned between the main body portion 52 of the bearing portion 24 and the bottom portion 30 as shown in FIG. 6A. Then, the bearing portion 24 is rotated with the locking portion 60 as a fulcrum, and the flared portion 54 is pushed to be housed in the frame portion 38. The rib 62 controls the locking portion 60 not to excessively get in the locked portion 44. Since the locking portion 60 defines a convex portion and the locked portion 44 defines a concave portion, the working is facilitated. Since the assembly is achieved only by rotating the bearing portion 24 with the locking portion 60 as a fulcrum, the assembling work is facilitated.

As shown in FIG. 6B, the flared portion 54 is housed in the frame portion 38 while the edge of the flared portion 54 is engaged with the elastic pawl portions 40. The flared portion 54 may be press-fitted to the frame portion 38. Thus, the pedestal portion 20, the retaining portion 22, and the bearing portion 24 are integrated by the simple operation, and the sub-assembly unit 12 of the retaining device 10 can be assembled. By disposing the rotating shaft portion 64 and the main body portion 52 close to the first side wall portion 32a, the size of the pedestal portion 20 to house the retaining portion 22 can be reduced.

In the sub-assembly unit 12, the locking portion 60 of the bearing portion 24 is engaged with the locked portion 44 while the flared portion 54 is engaged with the elastic pawl portions 40. To be specific, by engaging the locking portion 60 and the flared portion 54 that are disposed outward in the radial direction while sandwiching the main body portion 52 and the rotating shaft portion 64 therebetween, the integration in the sub-assembly unit 12 is facilitated, allowing also easy transportation. Only by inserting the rivet 26 into the insertion hole 36 and the insertion hole 56 in the sub-assembly unit 12 and into the mounting hole of the mounted member of the vehicle, the sub-assembly unit 12 can be easily mounted on the vehicle. For example, when mounted on a side wall surface or a ceiling, the sub-assembly unit 12 does not fall apart, and only pushing the rivet 26 into the side wall surface or the ceiling is enough, so that the mounting operation is easy.

As shown in the retaining device 10 in FIG. 6B, the movement of the locking portion 60 of the bearing portion 24 toward the opening edge (toward the upper portion in the drawing) is controlled by the locked portion 44 disposed on the first side wall portion 32a. With this configuration, when a load is applied on the baggage hanging portion 66 of the retaining portion 22, the load applied on the bearing portion 24 at the opening edge can be received by the locked portion 44. Further, since the rivet 26 also receives the load, the load bearing performance can be improved. As described above, since the locking portion 60 and the flared portion 54 are disposed so as to sandwich the rotating shaft portion 64 therebetween, the load received from the baggage hanging portion 66 can be dispersed. Thereby, the load bearing performance can be improved.

The locked portion 44 defines a concave portion disposed closer to the bottom portion 30 from a center position in a height direction of the first side wall portion 32a. The locking portion 60 is disposed at an end portion of the main body portion 52 and is placed close to the bottom portion 30. With this configuration, high rigidity against the load applied on the locked portion 44 from the locking portion 60 can be obtained by sufficiently securing the thickness of the first side wall portion 32a closer to the opening edge side than the locked portion 44. Thus, when a large load is applied on the locked portion 44, the first side wall portion 32a can be prevented from being deformed, and the load bearing performance can be improved. While functioning as temporary fasteners in the sub-assembly unit 12, the locking portion 60 and the locked portion 44 have the function of improving the load bearing performance when the retaining device 10 is fixed to the vehicle.

Figure 7A:
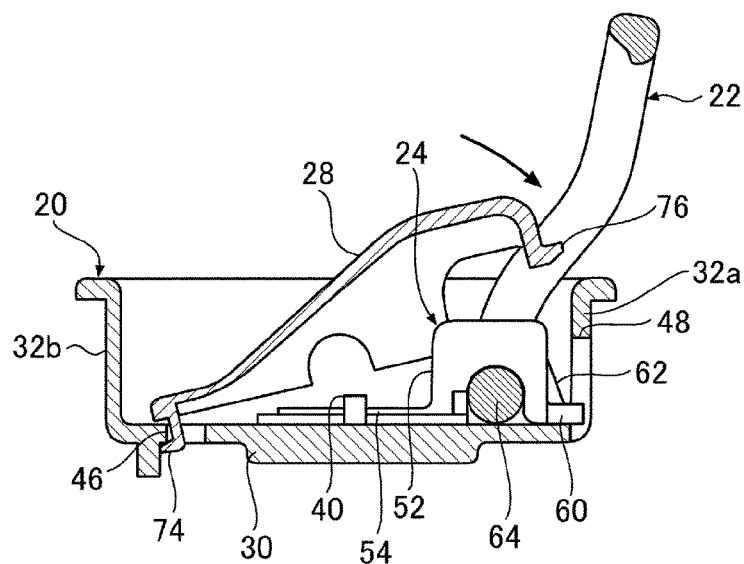
FIGS. 7A and 7B are views for illustrating the assembly of a cover potion.
Figure 7B:
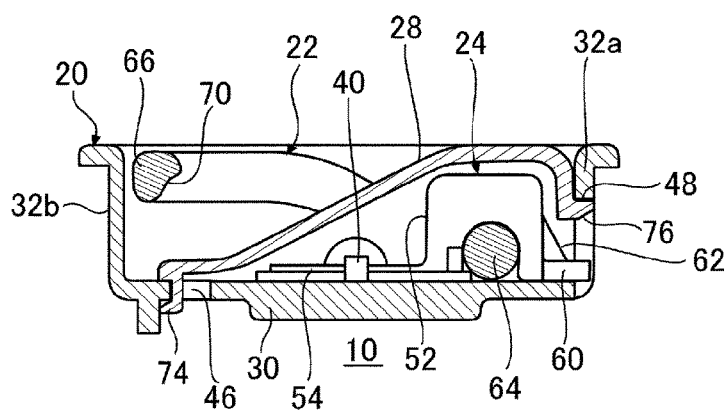

FIGS. 7A and 7B are views for illustrating the assembly of the cover portion 28. FIG. 7A is a view of the cover portion 28 in the middle of assembly, and FIG. 7B is a view of the cover portion 28 that has been already assembled. FIG. 7B is a cross-sectional view of the retaining device 10 taken along the line A-A of FIG. 1A, and that FIG. 7A is also a cross-sectional view of the same. While the cover 28 is mounted after the pedestal portion 20 and the bearing portion 24 are fixed by the rivet 26, the rivet 26 is not illustrated in FIGS. 7A and 7B.

As shown in FIGS. 3A and 7A, the first hook hole 46 is disposed closer to the second side wall portion 32b than the frame portion 38 in the bottom portion 30. The second hook holes 48 are disposed in the first side wall portion 32a. The cover portion 28 is fastened to the pedestal portion 20 by hooking the pawl portion 74 and the engagement portion 76, which are disposed on both the ends of the cover portion 28 in the front-back direction, on the first hook hole 46 and the second hook holes 48.

To be specific, as shown in FIG. 7A, the pawl portion 74 is inserted into the first hook hole 46 to rotate the cover 28 with the pawl portion 74 as a fulcrum, and then the engagement portion 76 is hooked to be pushed in the second hook holes 48. As shown in FIG. 7B, the cover portion 28 covers the entire bearing portion 24 to be mounted on the pedestal portion 20.

Since the cover portion 28 is separate from the pedestal portion 20, the front surface of the cover portion 28 can be easily coated with a material with high designability. If the cover portion 28 and the pedestal portion 20 are of a monolithic construction, the cover portion 28 is connected to the first side wall portion 32a by a thin hinge. In such a case, the rigidity of the first side wall portion 32a on the upper end portion of the locked portion 44 is reduced. For this reason, when a load is applied on the locked portion 44 from the locking portion 60, the first side wall portion 32a could be easily deformed. However, since the cover portion 28 is separate from the pedestal portion 20, the rigidity of the first side wall portion 32a on the upper end portion than the locked portion 44 can be improved.

As shown in FIG. 7B, the cover portion 28 gets in under the distal end side of the retaining portion 22. Increasing the region of the cover portion 28 in the bottom portion 30 in this manner can prevent dust or foreign materials from staying inside the bottom portion 30. Similarly to the bearing portion 24, the cover portion 28 is engaged at its one end with the bottom portion 30, and is engaged at its other end with the first side wall portion 32a. When a load is applied on the baggage hanging portion 66, the bearing portion 24 slightly floats to abut on the cover portion 28. Thus, the cover portion 28 can receive the load from the baggage hanging portion 66 as a backup for the bearing portion 24. The cover portion 28 may have a configuration that a portion of the cover portion 28 abuts on the bearing portion 24 or the rotating shaft portion 64 in a state where a load is not applied on the baggage hanging portion 66, and the cover portion 28 receives the load from the baggage hanging portion 66.

Figure 8A:
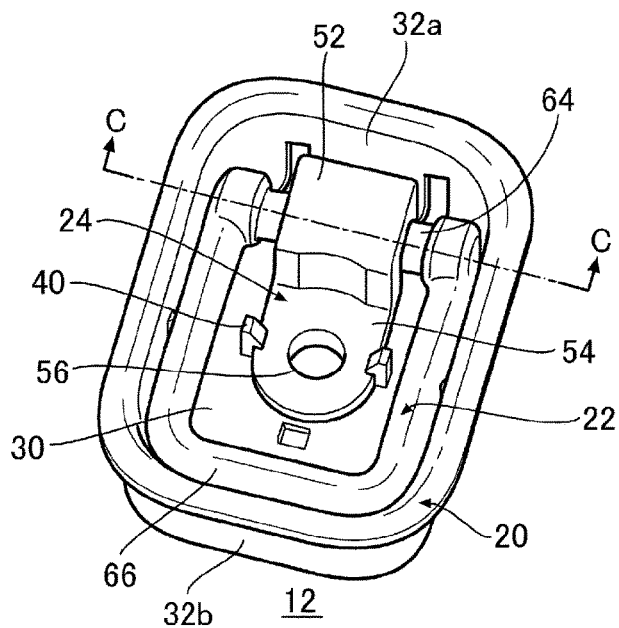
FIGS. 8A and 8B are views for illustrating the relation between a rotating shaft portion and the bearing portion.
Figure 8B:
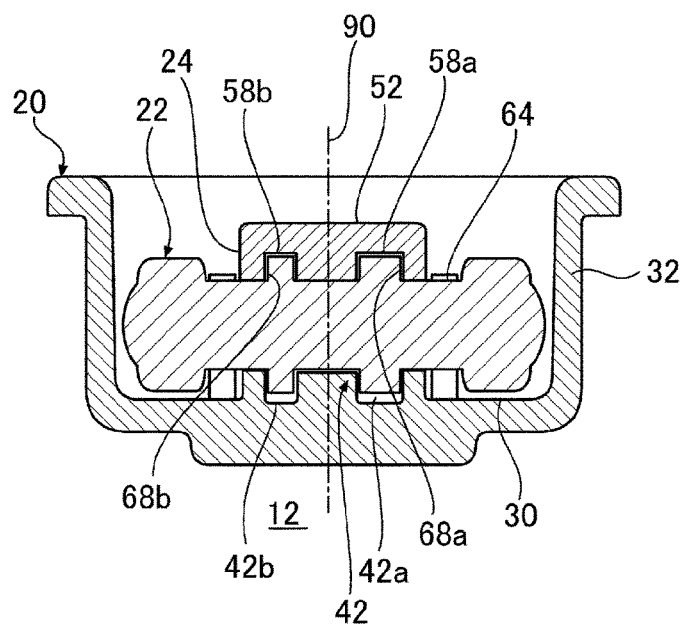

FIGS. 8A and 8B are views for illustrating the relation between the rotating shaft portion 64 and the bearing portion 24. FIG. 8A is a perspective view of the sub-assembly unit 12 of the retaining device 10. FIG. 8B is a cross-sectional view of the sub-assembly unit 12 taken along the line C-C of FIG. 8A As shown in FIG. 8A, the rotating shaft portion 64 is sandwiched between the main body portion 52 of the bearing portion 24 and the supporting portion 42 of the bottom portion 30 to be rotatably supported. As shown in FIG. 8B, the rotating shaft portion 64 is asymmetric with respect to its center position 64a in the axial direction. The first ring portion 68a disposed on the right side of the center line 90 is different in shape from the second ring portion 68b disposed on the left side of the center line 90.

The main body portion 52 and the supporting portion 42 are asymmetric respectively with respect to the center position 52a and the center position 42c in the axial direction of the rotating shaft portion 64. The main body portion 52 and the supporting portion 42 disposed on the right sides of the center line 90 are different in shape from the main body portion 52 and the supporting portion 42 disposed on the left sides of the center line 90. The ring portion 68 is convex, and the shaft supporting portion 58 and the supporting portion 42 are concave. The first ring portion 68a is sandwiched between the first shaft supporting portion 58a of the main body portion 52 and the first supporting portion 42a of the supporting portion 42. The second ring portion 68b is sandwiched between the second shaft supporting portion 58b and the second supporting portion 42b.

The main body portion 52 and the supporting portion 42 approach to abut on the rotating shaft portion 64, and support the rotate of the rotating shaft portion 64. The first ring portion 68a, which is larger in width in the axial direction than the second ring portion 68b, is arranged not to get in second shaft supporting portion 58b and the second supporting portion 42b. The above-described asymmetric shaft structure can limit the orientation in which the retaining portion 22 is mounted, and thus can prevent the retaining portion 22 from being mounted in the upside down direction. Only if at least one of the main body portion 52 and the supporting portion 42 is asymmetric with respect to the center position in the axial direction, the orientation in which the retaining portion 22 is mounted can be limited.

Figure 9:
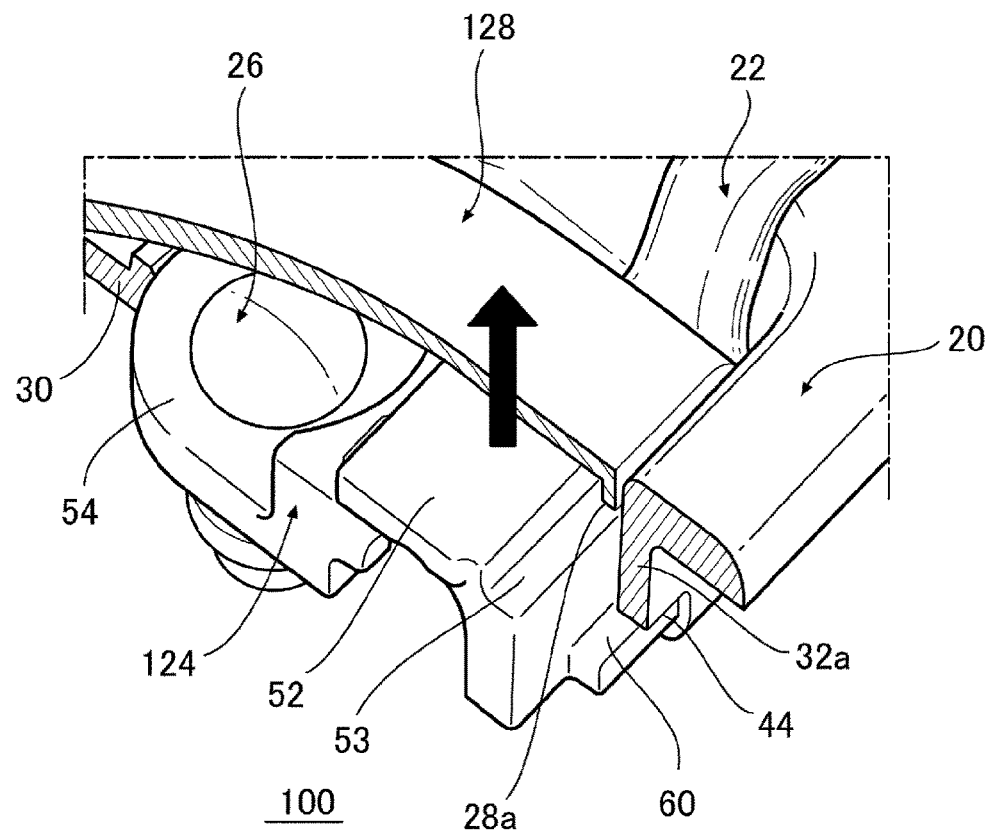
FIG. 9 is a view for illustrating a retaining device according to the first modification.

FIG. 9 is a view for illustrating a retaining device 100 according to the first modification. FIG. 9 is a cross-sectional view same as the view taken along the line B-B of FIG. 1B except a bearing portion 124 and a rivet 26.

The bearing portion 124 of the retaining device 100 according to the first modification does not include the rib 62 that is included in the retaining device 10 shown in FIG. 7B. The main body portion 52 according to the first modification includes a step portion 53 on its front surface, and an end portion 28a of a cover portion 128 is disposed in proximity to the step portion 53. The other structures are in a manner similar to those of the retaining device 10 shown in FIG. 7B.

When a baggage is hooked on the retaining portion 22, the main body portion 52 receives a load in the arrow direction in the drawing. The rivet 26 receives the load from the flared portion 54, and the locked portion 44 receives the load from the locking portion 60. To be specific, the locking portion 60 and the flared portion 54 receive the load applied on the retaining portion 22. Further, the end portion 28a of the cover portion 128 receives the load from the step portion 53 of the main body portion 52. As described above, the load applied on the retaining portion 22 is dispersed to be received. Thereby, the load bearing performance can be improved.

Figures 10A, 10B:
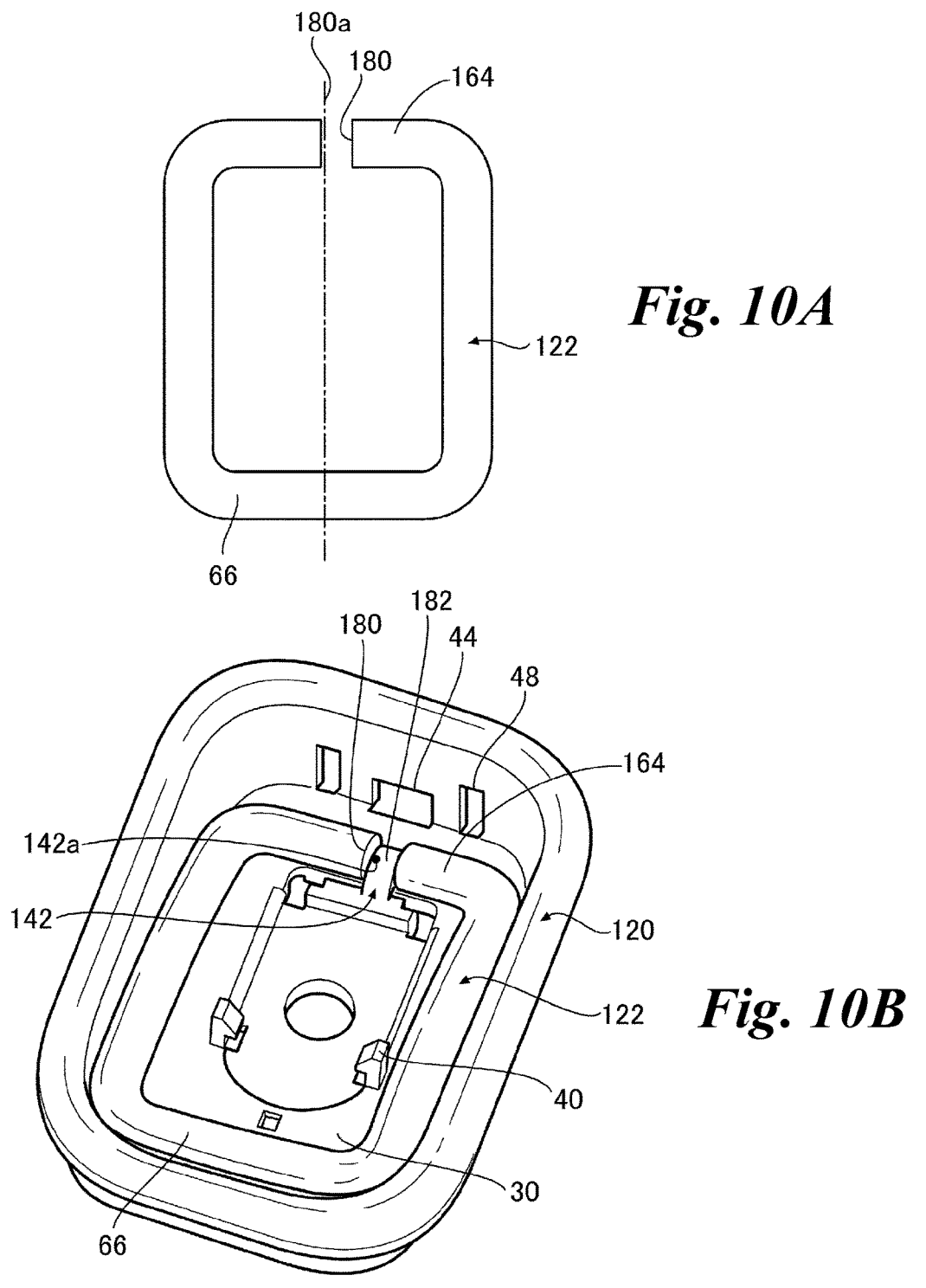

FIGS. 10A and 10B are views for illustrating a shaft structure according to the second modification. FIG. 10A is a front view of a retaining portion 122 according to the second modification. FIG. 10B is a perspective view of a pedestal portion 120 and the retaining portion 122 according to the second modification.

As shown in FIG. 10A, a rotating shaft portion 164 of the retaining portion 122 includes a slit 180. The slit 180 is displaced from a center portion 180a in the axial direction. The rotating shaft portion 164 is made asymmetric with respect to a center position 180a in the axial direction by the offset slit 180.

As shown in FIG. 10B, the pedestal portion 120 includes a protruding portion 182 that is offset from a center position 142a. The protruding portion 182 protrudes from the bottom portion 30, has flat both ends in the axial direction, and gets in the slit 180. The protruding portion 182 is included in a supporting portion 142 that rotatably supports the rotating shaft portion 164. The supporting portion 142 is made asymmetric with respect to the center position 142a in the axial direction of the rotating shaft portion 164 by the slit 180.

The above-described shaft structure that is asymmetric in the axial direction can limit the orientation in which the retaining portion 122 is mounted, and thus can prevent the retaining portion 122 from being mounted in the upside down direction. In addition, the protruding portion 182 can limit the movement of the rotating shaft portion 164 in the axial direction, which can prevent the retaining portion 122 from rattling in the axial direction.

Figure 11A:
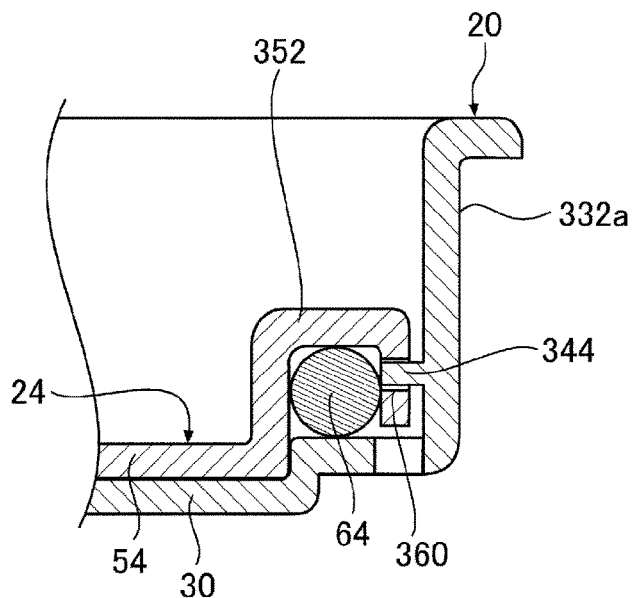
FIG. 11A is a view for illustrating an engagement structure of a locking portion and a locked portion of a retaining device according to the third modification.
Figure 11B:
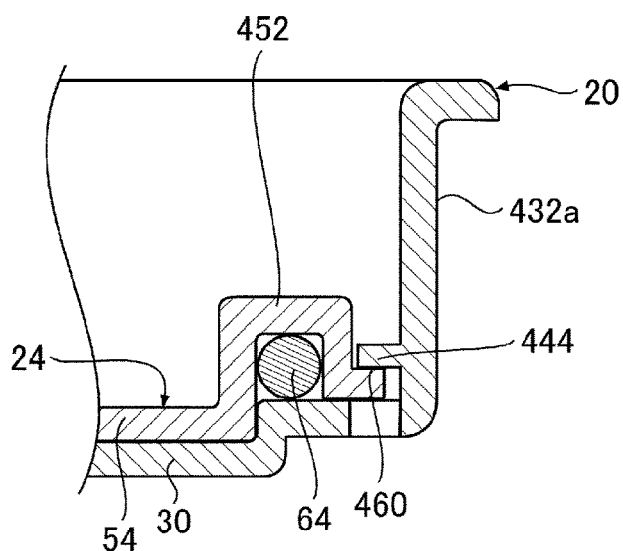
FIG. 11B is a view for illustrating an engagement structure of a locking portion and a locked portion of a retaining device according to the fourth modification.

FIG. 11A is a view for illustrating an engagement structure of a locking portion 360 and a locked portion 344 according to the third modification. FIG. 11B is a view for illustrating an engagement structure of a locking portion 460 and a locked portion 444 according to the fourth modification.

As shown in FIG. 11A, the locking portion 360 of a main body portion 352 according to the third modification defines a concave portion or a through-hole, and the locked portion 344 of a first side wall portion 332a defines a convex portion. The locked portion 344 protrudes inward from the first side wall portion 332a, and gets in to be engaged with the locking portion 360.

As shown in FIG. 11B, the locking portion 460 of a main body portion 452 according to the fourth modification defines a convex portion, and the locked portion 444 of a first side wall portion 432a defines a convex portion. The locked portion 444 protrudes inward from the first side wall portion 432. The locking portion 460 gets in the side of the bottom portion of the locked portion 444 to be engaged with the locked portion 444.

Even the engagement structures according to the third modification and the fourth modification can improve the load bearing performance by the engagement between the locking portions and the locked portions since the flared portions 54 are fixed to the bottom portions 30 by the rivets 26.

The present invention is not limited to the embodiments described above, and it is also possible to add modifications such as various kinds of design changes to the embodiments based on the knowledge of those skilled in the art. Embodiments to which such modifications are added can also be included within the scope of the present invention.

While the pedestal portion 20 and the bearing portion 24 are mounted on the mounted member by the rivet 26 in the embodiments, the present invention is not limited to these embodiments. For example, a screw member such as a bolt instead of the rivet 26 may be inserted into the insertion hole 36 and the insertion hole 56. A pin-shaped protrusion with a flange distal end may be provided to the mounted member, and the protrusion may be inserted into the insertion hole 36 and the insertion hole 56. To be specific, the pedestal portion 20 and the bearing portion 24 may be fixed by inserting a pin member such as the rivet 26 and the screw member into the insertion hole 36 and the insertion hole 56.

While the bearing portion 24 and the pedestal portion 20 are mounted on the mounted member of the vehicle by the rivet 26 in the embodiments, the present invention is not limited to these embodiments. For example, the bearing portion 24 and the rivet 26 may be of a monolithic construction. A protruding portion with the distal end increased in diameter may be provided to the flared portion 54 of the bearing portion 24 on the back surface, and the protruding portion may be inserted into the insertion hole 36 of the pedestal portion 20 and a mounting hole of the mounted member, and assembly is made. Thus, the number of components can be reduced.

A protruding portion with the distal end increased in diameter may be provided to the bottom portion 30 of the pedestal portion 20 so as to protrude toward the opening, and the protruding portion may be inserted into the insertion hole 56 of the bearing portion 24 to fix the pedestal portion 20 and the bearing portion 24. In this case, a protrusive fitting portion to be fitted into the mounting hole of the mounted member is provided on the outer surface of the bottom portion 30 of the pedestal portion 20. Thereby, the sub-assembly unit 12 is mounted on the mounted member.

While the rotating shaft portion 64 of the retaining portion 22 is rotatably supported by the bearing portion 24 and the supporting portion 42 of the pedestal portion 20 in the embodiments, the present invention is not limited to these embodiments. For example, the rotating shaft portion 64 may extend outward in the axial direction to be inserted into shaft holes provided to the side wall portion 32 of the pedestal portion 20. The shaft holes are provided to the third side wall portion 32c and the fourth side wall portion 32d, and the supporting portion 42 is disposed between the shaft holes. Thus, the load bearing performance can be further improved.

DESCRIPTION OF REFERENCE NUMERALS
AND SIGNS

10 Retaining device
12 Sub-assembly unit

20 Pedestal portion
22 Retaining portion
24 Bearing portion
26 Rivet
26a pillar portion
26b First flange portion
26c Second flange portion
28 Cover portion
30 Bottom portion
32 Side wall portion
32a First side wall portion
32b Second side wall portion
32c Third side wall portion
32d Fourth side wall portion
34 Flange portion
36 Insertion hole
38 Frame portion
40 Elastic pawl portion
42 Supporting portion
42a First supporting portion
42b Second supporting portion
44 Locked portion
46 First hook hole
48 Second hook hole
50 Positioning portion
52 Main body portion
53 Step portion
54 Flared portion
56 Insertion hole
58a First shaft supporting portion
58b Second shaft supporting portion
60 Locking portion
62 Rib
64 Rotating shaft portion
66 Baggage hanging portion
68a First ring portion
68b Second ring portion
70 Dent portion
72 Wide portion
74 Pawl portion
76 Engagement portion.

INDUSTRIAL APPLICABILITY

The present invention relates to a retaining device that includes a bearing portion to receive a load applied on a baggage hanging portion.

The invention claimed is:

1. A retaining device comprising:
a pedestal portion mounted on a vehicle;
a retaining portion comprising a rotating shaft portion and a baggage hanging portion; and
a bearing portion,
wherein the bearing portion comprises:
a main body portion that rotatably supports the rotating shaft portion;
a portion that is disposed on the main body portion, and is fixed to a bottom portion of the pedestal portion; and
a locking portion disposed on the main body portion,
wherein the pedestal portion comprises a locked portion to be engaged with the locking portion,
wherein the locking portion and the portion are disposed to sandwich the rotating shaft portion therebetween, and receive a load applied on the baggage hanging portion, and
wherein the pedestal portion includes an elastic pawl portion that engages with the portion.

2. The retaining device of claim 1,
wherein one of the locking portion and the locked portion comprises a concave portion or a through-hole, and the other comprises a convex portion to be engaged with the concave portion or the through-hole.

3. The retaining device of claim 2,
wherein the pedestal portion comprises a side wall portion erected from the bottom portion,
wherein the locked portion comprises the concave portion or the through-hole disposed closer to the bottom portion from a center position in a height direction of the side wall portion, and
wherein the locking portion is the convex portion to be inserted into the concave portion or the through-hole.

4. The retaining device of claim 1, wherein the pedestal portion comprises an elastic pawl portion that is disposed on the bottom portion and that engages an edge of the portion.

5. The retaining device of claim 1,
wherein the bottom portion of the pedestal portion comprises a supporting portion that rotatably supports the rotating shaft portion to sandwich the rotating shaft portion with the main body portion,
wherein the rotating shaft portion is asymmetric with respect to a center position in an axial direction of the rotating shaft portion, and
wherein at least one of the main body portion and the supporting portion rotatably supports the asymmetric rotating shaft portion.

6. The retaining device of claim 1, wherein the portion extends in a radial outer direction of the rotating shaft portion from one end of the main body portion.

7. The retaining device of claim 6, wherein the portion includes an insertion hole that is fixed to the bottom portion of the pedestal portion.

8. The retaining device of claim 7, wherein a rivet is inserted into the insertion hole.

9. The retaining device of claim 1, wherein the locking portion protrudes in a radial outer direction of the rotating shaft portion from the other end of the main body portion, and
wherein the locking portion and the portion are disposed so as to protrude in different directions in the radial outer direction.

10. The retaining device of claim 1, wherein the locking portion and the portion protrude in parallel in opposite directions while sandwiching the rotating shaft portion therebetween.

11. The retaining device of claim 9, wherein the locking portion and the portion protrude in parallel in opposite directions while sandwiching the rotating shaft portion therebetween.

12. The retaining device of claim 8, wherein the rivet receives the load from the portion, and the locked portion receives the load from the locking portion.

* * * * *